June 26, 1923.

C. A. HADLEY

WELDING

Filed Sept. 11, 1922 4 Sheets-Sheet 1

1,459,885

June 26, 1923. 1,459,885

C. A. HADLEY

WELDING

Filed Sept. 11, 1922 4 Sheets-Sheet 2

Inventor:
Cecil A. Hadley
By
Sturtevant & Mason
Attorneys

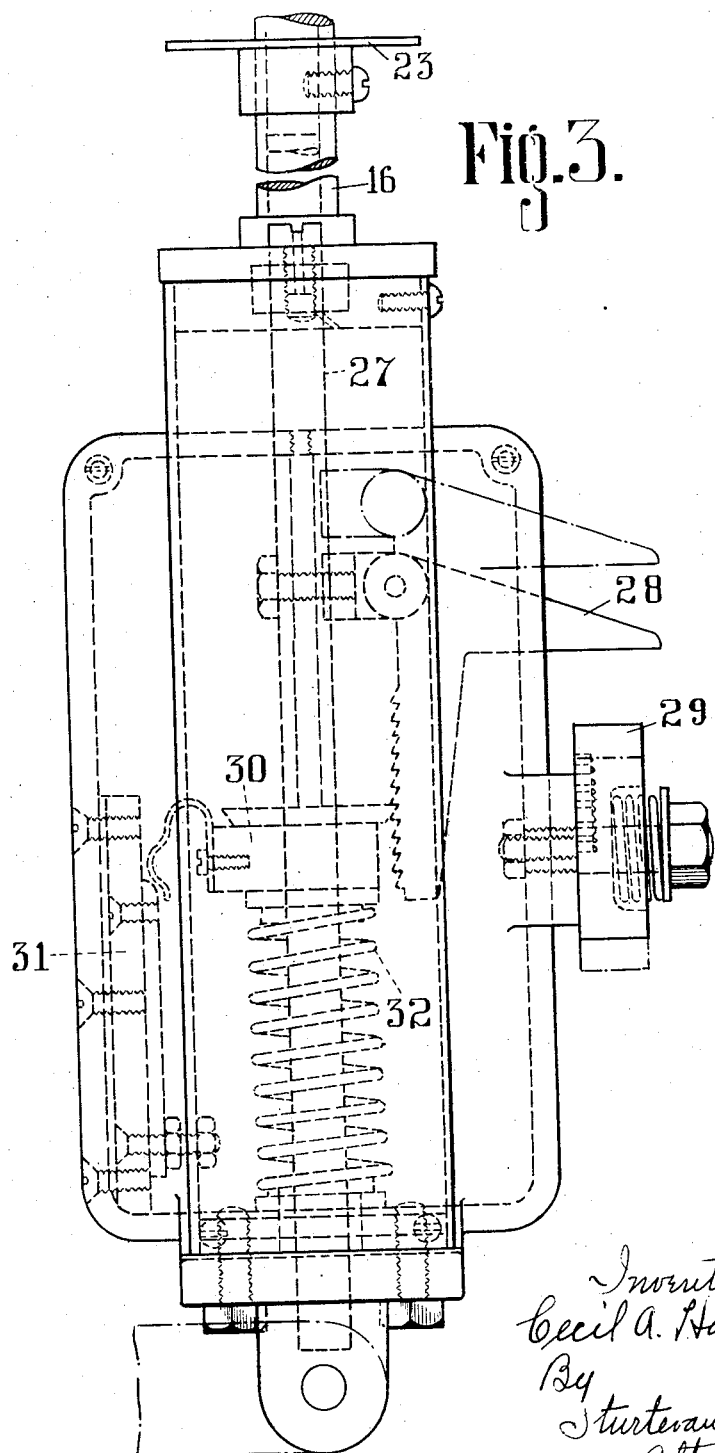

June 26, 1923.
C. A. HADLEY
1,459,885
WELDING
Filed Sept. 11, 1922
4 Sheets-Sheet 4
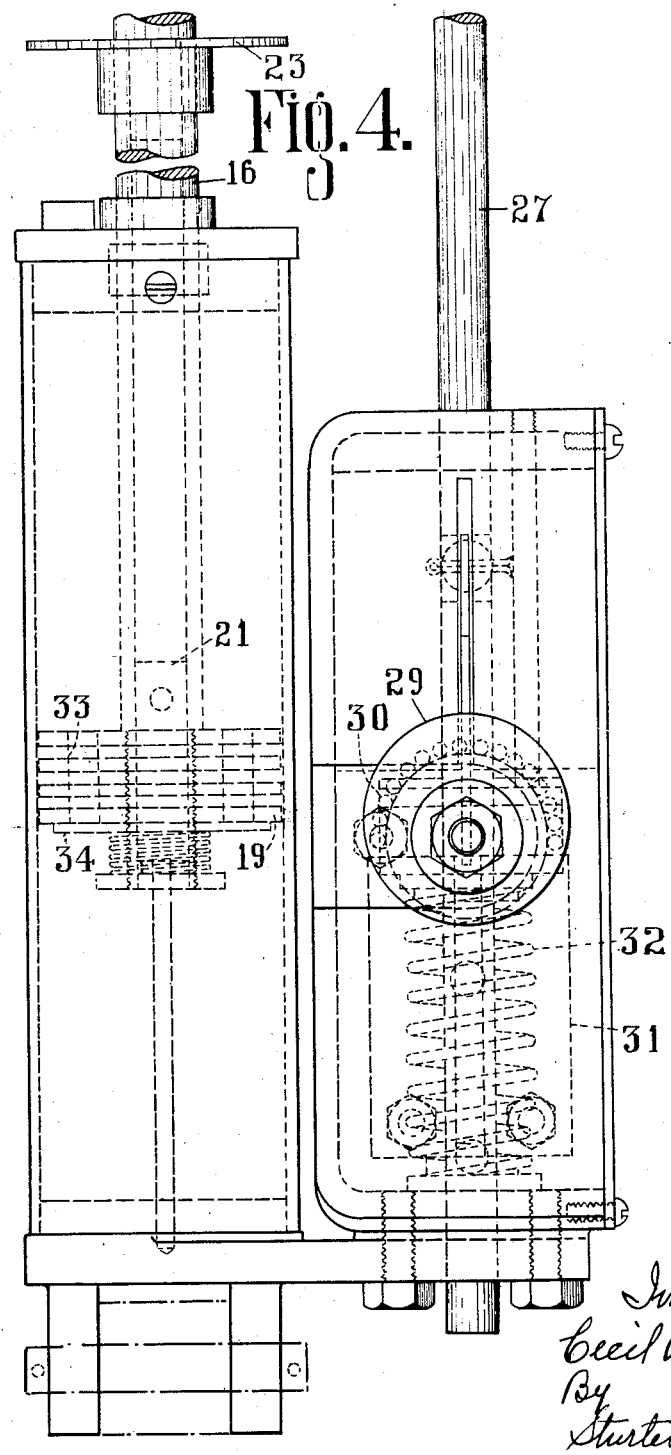

Patented June 26, 1923.

1,459,885

UNITED STATES PATENT OFFICE.

CECIL ALLARTON HADLEY, OF BRADFORD, ENGLAND, ASSIGNOR TO THE ROSE STREET FOUNDRY AND ENGINEERING COMPANY, LIMITED, OF INVERNESS, SCOTLAND.

WELDING.

Application filed September 11, 1922. Serial No. 587,488.

*To all whom it may concern:*

Be it known that I, CECIL ALLARTON HADLEY, a subject of the King of Great Britain, residing at Bradford, in the county of York and Kingdom of England, have invented certain new and useful Improvements in Welding, of which the following is a specification.

The present invention relates to improvements in welding and more particularly to what is known as butt welding.

In the formation of a butt weld as the metal becomes fluid it has been usual to press the parts of the work towards one another by hand with a view to obtaining intimate contact of the two parts, and fusion one into the other, and then also with a view to extruding burnt metal to the outside so as to form a homogeneous weld.

Mechanical welding machines are also known in which jaws for holding the work are displaced relatively to one another by cams rotated from a driving shaft, whilst again in further arrangements holders for the two pieces of work are pressed towards one another by means of a spring, which will allow further motion of the two parts of the work towards one another on the upset of the material as it becomes fluid.

These methods are however not fully successful in practice. The hand operation entails considerable skill and it will obviously almost be impossible to arrange that identical conditions apply to two successive pieces of work, whilst previous mechanical arrangements above mentioned have not been capable of adjustment, and further in the case of the cams the work is displaced too slowly, and in the case of springs, too suddenly.

Whilst these previous arrangements have operated the automatic displacement of the two pieces of work relatively to one another, none of them have attempted to control the rate of displacement.

According to the present invention means are provided to automatically control the rate of displacement of one movable part or electrode relatively to the other, and to immediately adjust as desired the said rate of displacement.

The invention will be more particularly described with reference to the accompanying drawings, in which:—

Figure 3 is an outside elevation of the dash pot device and trip switch.

Figure 4 is a corresponding side view.

Figure 5 is a partial sectional view of the dash pot.

Figure 6 is a sectional view of the line A—B of Fig. 5.

Figure 1:
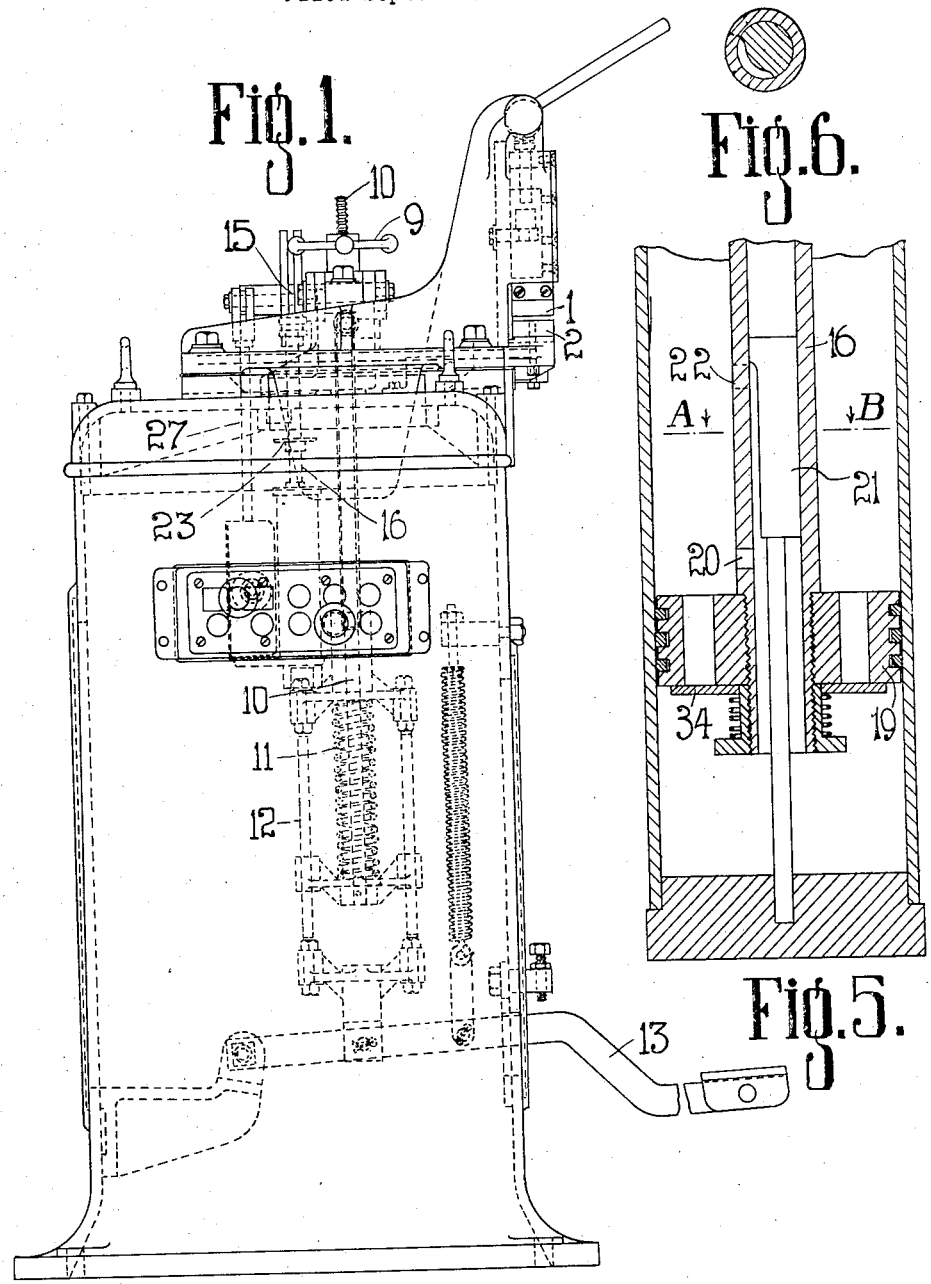
Figure 1 is an outside elevation of a welding machine having a device, according to the present invention, in one of its forms, attached thereto.
Figure 2:
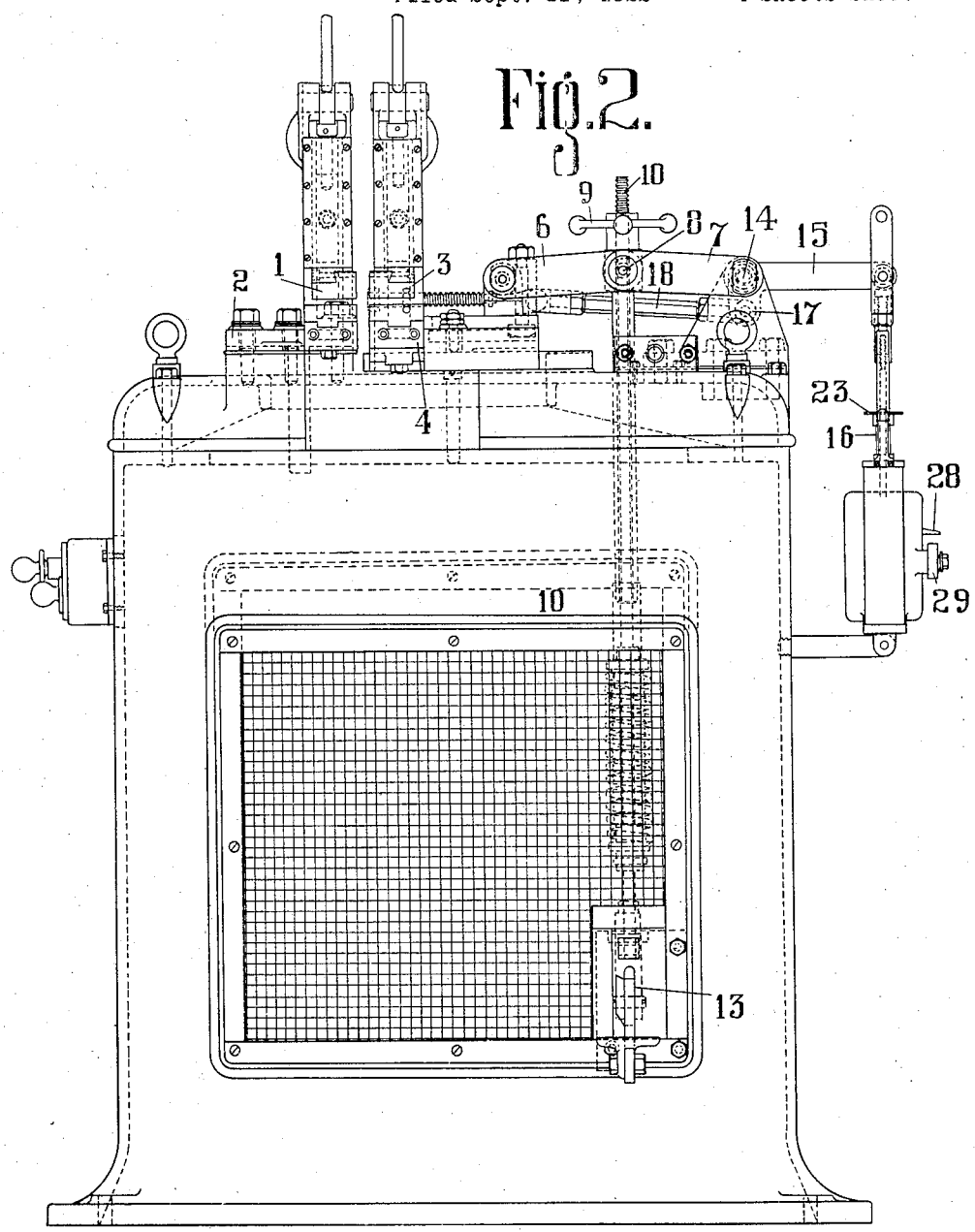
Figure 2 is a side elevation corresponding to Fig. 1.

The work is clamped between two pairs of jaws, 1, 2, 3, 4, the jaws 3, 4 being mounted on a slide, displaced along guides and connected to the end link 6, of a pair of links 6, 7, forming a toggle, the centre hinge pin 8, of which is connected to an adjustable nut 9, on a spindle 10, connected by a spring 11, to a yoke 12, operated by a foot pedal 13. This pedal 13, forms also the operating element of a trip switch of any desired form which may be for instance of the type described in British Patent No. 167,662. The outer hinge pin 14, of the link 7, also forms the pivot of a bell crank lever 15, connected to the piston rod 16 of a combined dash pot and trip switch. The outer arm 17, of the bell crank lever is coupled by the connecting rod 18, to the sliding block 5.

It will consequently be seen that as the pedal 13, is depressed, the spring 11, will be compressed but the block 5, will not be able to slide freely on its guides owing to the resistance of fluid such as oil below the piston 19, on the piston rod 16. The oil can however, escape along the hollow piston rod through the port 20, which port is adapted to be shrouded when the piston is in its upper position by a plunger valve 21, having a flat or other recess cut away from one face as shown in Fig. 6.

It will be seen therefore that as the piston 19, descends, from a position in which the port lies in the position shown in dotted lines at 22, (Fig. 5) to the position shown in full lines at 20 (Fig. 5) the restricted passage for the fluid from the bottom to the top of the piston 19, becomes shorter and shorter until when the port reaches the position shown in Fig. 5 a free passage for the oil is provided to permit the action of the spring 11 in the displacement of the block 5, carrying the movable electrode 3, 4.

By rotating the piston rod 16, relatively to the valve 21, by means of a graduated disc 23, the port may be brought from the position as shown in dotted lines at 25, to the position shown in dotted lines at 26, (Fig. 6) the position shown at 25, being a position for very slow movement of the dash-pot piston, whilst that at 26, corresponds to the fastest movement available for the said piston.

As the piston rod 16, and with it the spindle 27, of the trip switch connected to it, can now descend rapidly the trigger 28, will be struck out of position by contact with the edge of an adjustable cam 29, to release the contact head 30, making contact with the contact block 31, so that it will fly up under action of the spring 32, and break the welding circuit.

The work is now completed and upon the foot pedal being released the jaws will return to their original position under action of the spring 11, the oil can flow freely from the top to the bottom of the piston through the ports 33 past the automatic flap valve 34 and other parts will be restored to their initial position to allow of commencement of a fresh operation.

The improvements of the present invention are applicable particularly to electric resistance butt and spot welding but are also applicable to other methods of butt welding where for instance an electrode is moved relatively to a piece or pieces of work to be welded.

Other equivalent devices can be used for the dash pot, such as a slow acting solenoid or mechanical means such as a variable speed friction driving gear of the wheel and disc type which can be set to automatically predetermine the rate of displacement of one part relatively to the other.

I declare that what I claim is:—

1. An electrode welding machine comprising electrodes, means to displace said electrodes towards one another and means to control the speed of displacement of said electrodes throughout their range of travel.

2. An electric welding machine comprising supports for work pieces, means to displace said supports relatively to one another and a dash-pot to control the speed of displacement and means to adjust the resistance of the dash-pot.

3. An electric welding machine comprising movable electrodes, an electric circuit containing said electrodes, a trip switch in the circuit of said electrodes, means to displace said electrodes relatively to one another, a dash-pot to control the speed of displacement and a connecting link between the movable element of said dash-pot, and the movable element of said trip switch.

In witness whereof, I have hereunto signed my name this 14th day of August 1922, in the presence of two subscribing witnesses.

CECIL ALLARTON HADLEY.

Witnesses:
 WILLIAM ROSS,
 ALEXANDER FINLAYSON.